United States Patent [19]
Oya

[11] Patent Number: 4,985,607
[45] Date of Patent: Jan. 15, 1991

[54] HIGH FREQUENCY HEATING APPARATUS HAVING DETACHABLE ROTATABLE SKEWER

[75] Inventor: Yuichiro Oya, Sennan, Japan

[73] Assignee: Sharp Kabushiki Kaisha, Osaka, Japan

[21] Appl. No.: 251,811

[22] Filed: Sep. 30, 1988

[30] Foreign Application Priority Data

Oct. 2, 1987 [JP] Japan ............................ 62-151881[U]

[51] Int. Cl.$^5$ ............................................. H05B 6/78
[52] U.S. Cl. ....................... 219/10.55 E; 219/10.55 F;
219/389; 99/421 H; 99/DIG. 14; 126/338
[58] Field of Search ................... 219/10.55 F, 10.55 E,
219/10.55 R, 10.55 A, 389, 392; 99/421 H, 421
HH, 419, 451, DIG. 14; 126/338

[56] References Cited

U.S. PATENT DOCUMENTS

| | | | |
|---|---|---|---|
| 3,049,073 | 8/1962 | Edelston | 99/446 |
| 3,254,591 | 6/1966 | Cohen et al. | 99/421 H |
| 3,602,131 | 4/1969 | Dadson | 99/421 H |
| 3,733,999 | 5/1973 | Bernstein | 99/421 H |
| 3,848,522 | 11/1974 | Trelc | 99/421 H |
| 3,874,278 | 4/1975 | Groce | 99/421 H |
| 4,409,452 | 10/1983 | Oouchi et al. | 219/10.55 F |
| 4,471,195 | 9/1984 | Ishii et al. | 219/10.55 E |
| 4,664,924 | 5/1987 | Sugisawa et al. | 219/10.55 A |
| 4,717,802 | 1/1988 | Colato | 219/10.55 E |
| 4,771,156 | 9/1988 | Strattan et al. | 219/10.55 F |
| 4,810,856 | 3/1989 | Javanovic | 99/421 H |

FOREIGN PATENT DOCUMENTS 57-10031  1/1982  Japan .
337317  11/1955  Switzerland .

Primary Examiner—Philip H. Leung

[57] ABSTRACT

A high frequency heating apparatus comprises a heating chamber (28), a metal skewer (5), a rotary driving portion (F) and a coupling (13). The heating chamber (28) comprises a high frequency generator (3) and a heater (2) for heating foods (26) contained therein. The metal skewer (5) supports the skewered food (26) and is rotatably suspended between both sidewalls (28b, 28c) of the heating chamber (28). The rotary driving portion (F) is provided for rotating the metal skewer (5) in the heating chamber (28). One end portion (5a) of the metal skewer (5) is coupled with the rotary driving portion (F) by the coupling (13). The coupling (13) is provided on the outside of one sidewall (28c) of the heating chamber (28). A support member (G) is provided at the position opposed to the coupling (13) for rotatably supporting the other end portion of the metal skewer (5). The support member (G) is detachably provided projecting from the other sidewall (28b) of the heating chamber (28). The support member (G) is constituted by a spacer (8) receiving a groove (7) provided on the other end portion of the metal skewer (5) and a bracket (10) for mounting the spacer (8) projecting from the sidewall (28b). The entire length of the metal skewer (5) is shorter than the distance between both sidewalls (28b, 28c) of the heating chamber.

23 Claims, 3 Drawing Sheets

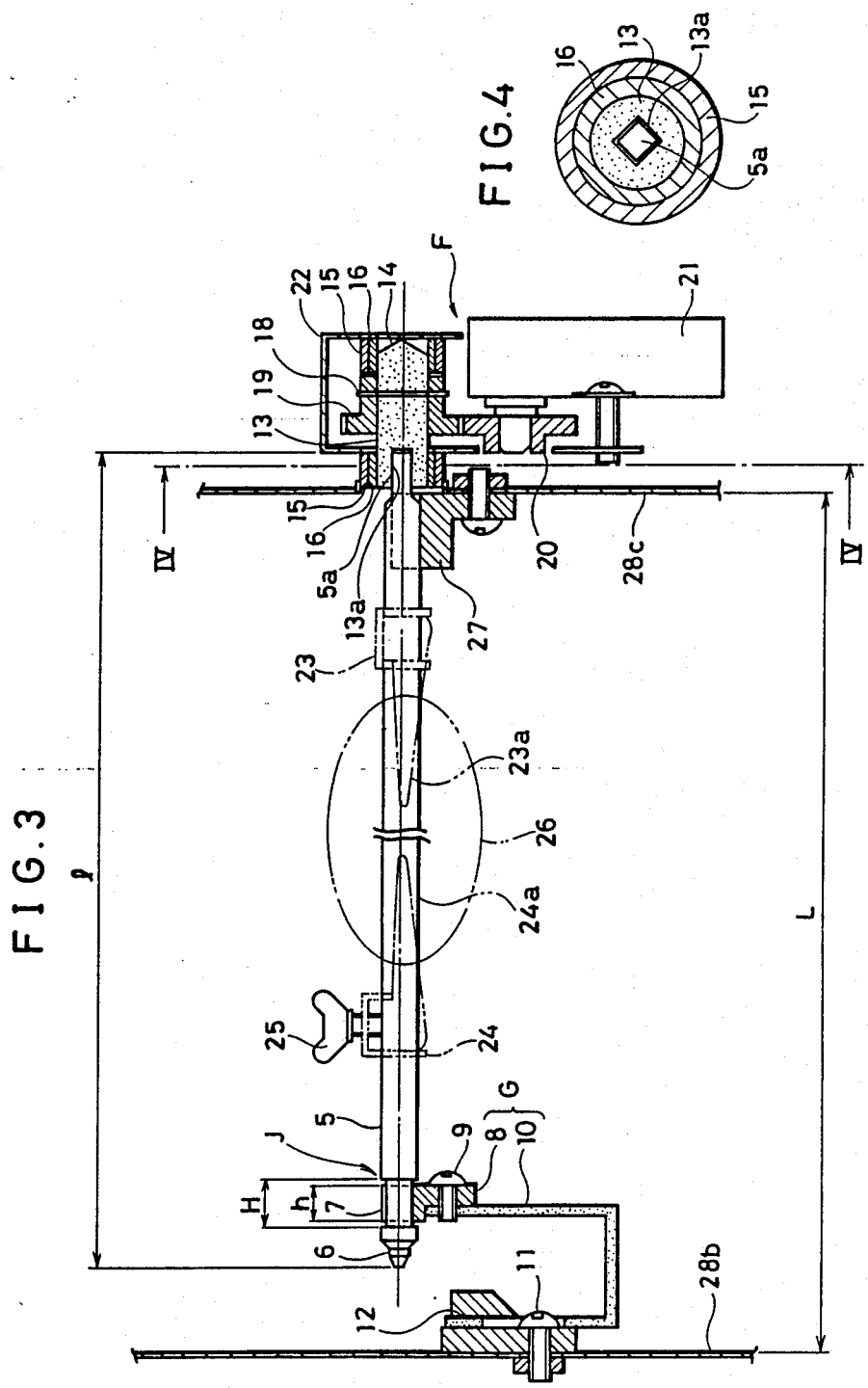

FIG.5A
FIG.5B
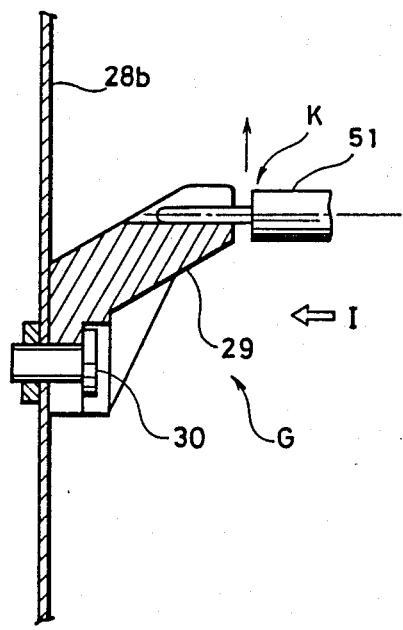
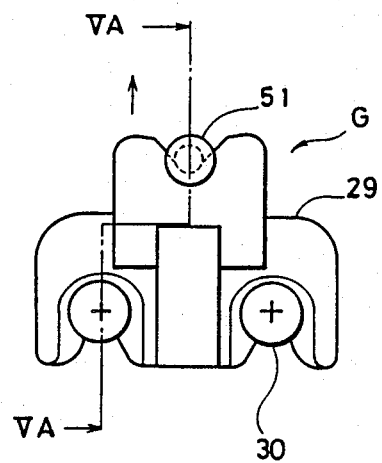

HIGH FREQUENCY HEATING APPARATUS HAVING DETACHABLE ROTATABLE SKEWER

BACKGROUND OF THE INVENTION

1. Field of the Invention

The present invention relates to a high frequency heating apparatus having a high frequency generating apparatus as well as heating means such as a heater. More specifically, the present invention relates to a high frequency heating apparatus which can be cleaned easily.

2. Description of the Prior Art

High frequency heating apparatuses which also have heating means such as heaters generally employ various methods for preventing uneven heating and uneven roasting to provide uniformly cooked foods. Such methods comprise rotating a pan on which the foods are placed, forcing air circulation in the heating chamber using a fan, and so on.

However, even when these methods are employed, a portion of the food in contact with the pan is not well roasted, and sometimes, upper portion and lower portion of the food are unevenly cooked due to the distribution of the broth, sources, juice and so on. Therefore, foods must be turned during cooking.

In consideration of the foregoing, an apparatus is proposed in Japanese Patent Laying-Open Gazette No. 10031/1982 (hereinafter referred to as a high frequency heating apparatus of D).

The high frequency heating apparatus D comprises a metal grill skewer arranged rotatively at the central portion of a heating chamber, and the food pierced by the grill skewer is rotated by rotary driving means to be heated and cooked.

Consequently, the food is uniformly roasted and the broth sauce or juice is circulated around the surface of the food to uniformly go the food, and therefore, the food can be cooked well. However, the high frequency heating apparatus D must employ a structure for preventing leak of the high frequency energy from the high frequency heating chamber to the outside and a heat resistant structure strong enough to be used with two or more heat sources. As a result, coupling structure between the rotary driving means and the metal grill skewer is rather complicated.

More specifically, a coupling portion, which can be attached to the rotary driving means, is provided projecting from the sidewall of the heating chamber. A portion to be coupled provided on one end of the metal grill skewer capable of being coupled to the coupling portion comprises a number of parts. For example, the portion to be coupled comprises a coupling slidably mounted on the metal grill skewer, a coil spring forcing the coupling to the coupling portion side, and a washer to be engaged with the coil spring.

Consequently, residues of foods, oil and so on smudge the coupling portion and the parts constituting the member to be coupled, and therefore, the heating chamber of the high frequency heating apparatus D can not be easily cleaned.

SUMMARY OF THE INVENTION

The present invention was made to solve the above described problem and its object is to provide a high frequency heating apparatus in which the coupling structure between the rotary driving means and the metal skewer is made simple to facilitate cleaning.

The high frequency heating apparatus in accordance with the present invention comprises a heating chamber, support means, rotary driving means and coupling means. The heating chamber comprises at least two opposing sidewalls for heating foods contained therein by high frequency generator and/or by heater. The support means supports skewered foods and it is rotatively suspended between the sidewalls of the heating chamber. The rotary driving means rotates the support means in the heating chamber. The coupling means is provided on the outer side of one sidewall of the heating chamber and is capable of coupling one end portion of the support means with the rotary driving means.

Preferably, the high frequency heating apparatus in accordance with the present invention further comprises a support member. A support member is detachably provided on a position opposing to the coupling means protruding from the other sidewall of the heating chamber and capable of rotatively supporting the other end portion of the support means. More preferably, the length of the support means along the direction of the suspension is shorter than the distance between the sidewalls. The other end portion of the support means has a groove to be engaged with the support member, and the length of the groove is preferably longer than the length of the engaging portion of the support member. The support means preferably comprises fixing means for fixing foods on the support means at the central portion thereof. The coupling means has a concave portion at one end portion thereof for receiving one end portion of the support means. The concave portion has a polygon cross section, and preferably, that cross section is similar to the cross section of one end portion of the support means. A guiding member should be preferably provided for guiding one end portion of the support means to be received in the concave portion. The guiding member may be detachably attached on the inner side of one sidewall of the heating chamber.

Since the high frequency heating apparatus in accordance with the present invention is structured as described above, the support means with the food skewered therethrough is introduced in the heating chamber, and thereafter, the support means is moved in the heating chamber in the direction orthogonal to the direction of introduction. By doing so, the support means and the rotary driving means are coupled with each other, and both ends of the support means are rotatively supported by the sidewalls.

When the high frequency heating apparatus should be cleaned, the sidewalls of the heating chamber can be made smooth by removing the support means. Only a portion to be coupled is formed on one end portion of the support means, which portion can be coupled with the coupling means provided on the outer side of the sidewall of the heating chamber. Therefore, residues of foods hardly smudge the coupling means and the portion to be coupled formed on one end portion of the support means.

The foregoing and other objects, features, aspects and advantages of the present invention will become more apparent from the following detailed description of the present invention when taken in conjunction with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a partial cross sectional view taken along the line III—III in FIG. 1;

FIG. 4 is a cross sectional view taken along the line IV—IV of FIG. 3;

FIG. 5A is a partial cross sectional view showing another embodiment of the support member G, showing a cross section viewed from the line VA—VA in FIG. 5B; and FIG. 5B is a partial plan view from the direction of the arrow I in FIG. 5A.

DESCRIPTION OF THE PREFERRED EMBODIMENT

One embodiment of the present invention will be described in the following with reference to appended drawings. The following embodiment is an example of, an actual application of the present invention and it is not intend to limit the technical scope of the present invention.

Figure 1:
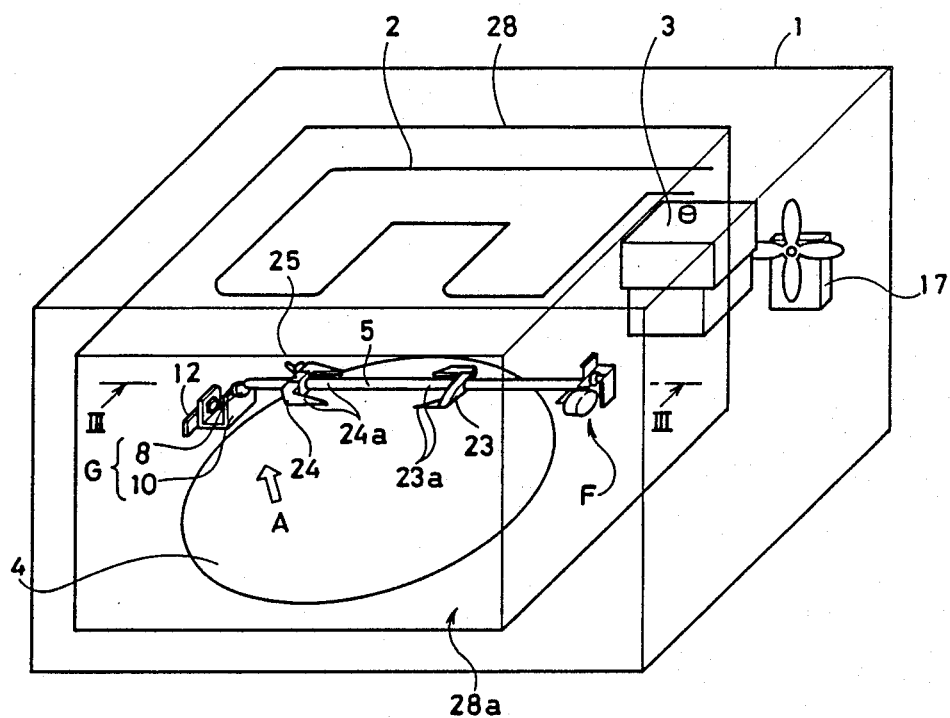
FIG. 1 is a perspective view of the inner portion of the high frequency heating apparatus in accordance with one embodiment of the present invention.
Figure 2A:
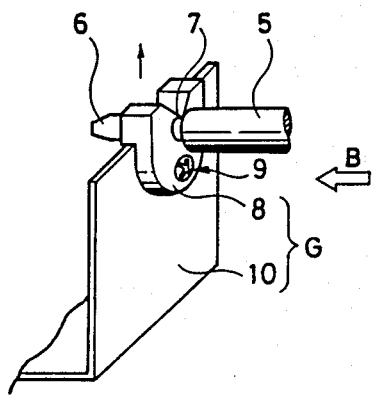
FIG. 2A is a partially enlarged perspective view along the direction shown by the arrow A in FIG. 1.
Figure 2B:
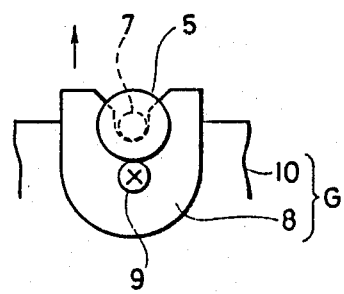
FIG. 2B is a partial plan view from the direction of the arrow B in FIG. 2A.

FIG. 1 is a perspective view of the inner side of the high frequency heating apparatus in accordance with one embodiment of the present invention, FIG. 2A is a partially enlarged perspective view from the direction shown by the arrow A in FIG. 1, FIG. 2B is a partial plan view from the direction of the arrow B in FIG. 2A, FIG. 3 is a partial cross sectional view taken along the line III—III in FIG. 1, and FIG. 4 is a cross sectional view taken along the line IV—IV in FIG. 3.

The high frequency heating apparatus in accordance with the present embodiment comprises a heating chamber 28, a metal skewer 5 (support means), rotary driving means F, a coupling 13 (coupling means) and a support member G as shown in FIGS. 1, 2A, 2B and 3. The heating chamber 28 contains a heater 2 heating means) for heating food 26. A high frequency oscillator 3 (high frequency generating means) such as magnetron and the like is provided outside the heating chamber 28 to supply high frequency electromagnetic wave through a wave guide into the heating chamber 28. The metal skewer 5 supports the skewered food 26 and it is transversely and rotatably suspended between the side walls of the heating chamber 28. The rotary driving means F is constituted by a driven gear 19 attached on a coupling 13 which can be coupled to a portion 5a on one end portion of the metal skewer 5, a driving gear 20 provided to engage with the driven gear 19, and a motor 21 having a rotary axis on which the driving gear 20 is provided. The coupling 13 is provided on the outer side of one sidewall 28c of the heating chamber 28 and it couples the rotary driving means F with the portion 5a provided on one end portion of the metal skewer 5. The support member G is arranged at a position opposing to the coupling 13 and rotatably supports the groove 7 provided on the other end portion of the metal skewer 5.

A door (not shown) for preventing a leak of high frequency energy and an operation panel (not shown) adjacent thereto having a timer, mechanism for opening and closing the door and so on are arranged in front of the opening 28a of the heating chamber 28.

A pan 4 provided on the bottom surface of the heating chamber 28 also serves to receive broth and the like coming out from the food 26.

The metal skewer 5 is formed of a metal bar having circular or rectangular cross section, and made of stainless steel or a rust-proofing metal material such as chrome plated metal. The entire length 1 of the metal skewer 5 is selected to be shorter than the width L of the opening 28a of the heating chamber 28, that is, the distance between the sidewalls 28b and 28c, by a prescribed distance, for example, about 1 cm. In other words, the entire length 1 of the metal skewer 5 is selected in association with the width L of the opening 28a so as to enable the skewer 5 to be inserted from the opening 28a and the portion 5a of the skewer 5 to be easily inserted in and pulled out of the coupling 13. The portion 5a to be coupled has a cross section of a polygon, for example a square such as shown in FIG. 4, in order to prevent slippage of the metal skewer 5 in the direction of rotation.

The tip end portion 6 of the metal skewer 5 is pointed so as to easily skewer the food 26.

The groove 7 provided on the other end portion of the metal skewer 5 is for rotatably supporting the metal skewer 5 and for preventing the metal skewer 5 from slipping out of the coupling 13 during rotation. The width H of the groove 7 is selected to be a little larger than the width h of a spacer 8 constituting the support member G. A step shown by an arrow J may be provided on one end instead of the groove 7 so as to prevent the metal skewer 5 from slipping out of the coupling 13 during rotation.

Therefore, the deformation of the heating chamber, 28 derived from the thermal expansion and differences in the width L of the opening 28a derived from the slight differences between each of the product generated in forming the heating chambers 28 can be compensated for. The rotation of the metal, skewer 5 can be made smooth.

A fixed fitting 23 for holding the food 26 to thereby rotate with the metal skewer 5 is fixed on the central portion of the metal skewer 5, by, for example, spot welding. A pair of pawls 23a provided on the fixed fitting 23 pierces the food 26 to prevent rotation of the food 26 about the metal skewer 5.

A movable fitting 24 having a pair of pawls 24a which is similar to that of the fixed fitting 23 is slidably provided at a portion of the metal skewer 5 opposing to the fixed fitting 23. A thumbscrew 25 is provided on the movable fitting 24. By means of the thumbscrew, the movable fitting 24 can be freely moved on the metal skewer 5 to be fixed in correspondence with the size of the food skewered by the metal skewer 5.

The fixed fitting 23, the movable fitting 24 and the thumbscrew 25 are formed of rust-proof metals such as stainless steel.

The support member G is detachably provided protruding from the other sidewall 28b of the heating chamber 28. The support member G comprises a spacer 8 and a bracket 10.

The spacer 8 is formed of dielectric which is lubricative, heat resistant and has a small high frequency loss, such as tetrafluoroethylene resin. The spacer 8 is fixed on the bracket 10 by means of a fitting screw 9.

The bracket 10 is formed of a rust-proofing metal plate such as stainless steel. The bracket 10 is detachably hanged on a support 12 which is fixed on the sidewall 28b by a fixing screw 11.

The support 12 is formed of dielectric having a high heat resistance and small loss of high frequency energy, such as ceramics.

The spacer 8, fixing screw 9 and the bracket 10 are detachable from the sidewall 28b as described above in order to facilitate cleaning of these parts, namely, the spacer 8, fixing screw 9 and the bracket 10, and of the inside of the heating chamber 28. In addition, since those parts are structured as described above, the heating chamber 28 can be effectively used when foods are cooked without using the metal skewer 5.

The support member G may be formed of a skewer support in which the spacer 8, the bracket 10 and the support 12 are unitary combined. FIG. 5A is a partial cross sectional view corresponding to the side of the support member G in FIG. 3, showing another embodiment of the support member G formed of one unit. FIG. 5B is a partial plan view from the direction of the arrow I in the FIG. 5A. FIG. 5A is a cross sectional view taken along the line VA—VA in FIG. 5B.

Referring to FIGS. 5A and 5B, the skewer support 29 which is an integrated unit serving as the support member G is detachably provided protruding from the other sidewall 28b of the heating chamber 28. The skewer support 29 is formed of a dielectric such as ceramics having high heat resistance and small loss of high frequency energy. The skewer support 29 is fixed on the sidewall 28b by a fixing screw 30. The metal skewer 51 is rotatably supported by the skewer support 29. A step shown by an arrow K may be provided on one end of the metal skewer 51 so as to prevent the metal skewer 51 from slipping out of the coupling during rotation.

When the support member G is constituted by the skewer support 29, the attachment and detachment of the support member G to and from the sidewall 28b can be carried out only by the attachment and detachment of one unit. Namely, the trouble in attaching and detaching the support member G to and from the sidewall 28b which required attachment and detachment of a plurality of parts, that is, the spacer 8, the bracket 10 and the support 12 can be eliminated.

A coupling 13 coupling the portion 5a to be coupled of the metal skewer 5 with the rotary driving means F is arranged out of one sidewall 28c of the heating chamber 28. The coupling 13 is formed of a rust-proofing metal such as stainless steel.

A hole 13a is provided at one end of the coupling 13 to receive the portion 5a to be coupled of the metal skewer 5. The cross section of the hole 13a is similar to that of the portion 5a to be coupled, as shown in FIG. 4.

The other end portion 14 of the coupling 13 is formed conical. This enable smooth rotation of the coupling 13 even when it is in contact with the fitting angle iron 22 to receive the thrust load.

The coupling 13 is rotatably supported by a set of bearings 16 formed of oil impregnated sintered metal. The bearing 16 is pressed in a metal cylinder 15 formed of, for example, stainless steel. The metal cylinder 15 is attached to the fitting angle iron 22.

A driven gear 19 is mounted on the coupling 13 by means of a roll pin 18. The driven gear 19 is engaged with a driving gear 20 provided on a motor 21. The motor 21 is supported by the fitting angle iron 22.

The driven gear 19 and the driving gear 20 are formed of resin such as mineral reinforced nylon having heat resistance and toughness.

The rotary driving means F structured as described above is arranged next to the high frequency oscillator 3 constituting an electric unit of the high frequency heating apparatus. Consequently, each of the parts constituting the rotary driving means F are heated to rather high temperature by heat radiation from the sidewall 28c and by the heat transmitted through the fitting angle iron 22, the coupling 13, the bearing 16 and the metal cylinder 15. In order to cope with the heating, a fan motor unit 17 is provided for cooling electrical parts. Each of the parts constituting the rotary driving means F can be cooled by the cool air emitted from the fan motor unit 17.

Consequently, those parts employed in a conventional apparatus for insulating heat, such as a heat insulator can be omitted.

A metal bar guide 27 is detachably provided in the inner surface of the sidewall 28 below the coupling 13. The metal bar guide 27 is provided for guiding and facilitating reception of the portion 5a to be coupled of the metal skewer 5 in the coupling 13 provided on the outside of the heating chamber 28.

The high frequency heating apparatus of the present invention is structured in this manner.

The processes of heating foods 26 using the high frequency heating apparatus will be describe in the following.

First, the metal skewer 5 which skewer and support the food 26 is inserted from the opening 28a of the heating chamber 28. Thereafter, the metal skewer 5 is placed on the upper side of the spacer 8 and the metal bar guide 27.

Thereafter, the metal skewer 5 having circular or rectangular cross section is slid in the direction of the coupling 13 with the skewer 5 being rotated, and the portion 5a to be coupled of the metal skewer 5 is received by the hole 13a of the coupling 13 without the need of visual checking.

By operating a start button of the operating panel (not shown), the food 26 and the metal skewer 5 are rotated and driven by the motor 21. At the same time, the food 26 is heated and cooked by the heater 2 and/or the high frequency oscillator 3. On this occasion, the food 26 may be simultaneously heated and cooked by the heater 2 and the high frequency oscillator 3. After the food is simultaneously heated, the high frequency oscillator 3 may be stopped and only the heater 2 may continue heating. Alternatively, the food 26 may be heated only by the high frequency oscillator 3 at first, and thereafter, it may be heated by the heater 2. In addition, the heating by the high frequency oscillator 3 and the heating by the heater 2 may be alternately repeated.

When the high frequency heating apparatus should be cleaned, the metal skewer 5, the support member G and the metal bar guide 27 are removed from the heating chamber 28, whereby the inside of the heating chamber 28, that is, both sidewalls 28b and 28c become flat with no projection. Therefore, the inside of the heating chamber 28 can be easily cleaned.

In addition, since the coupling portion between the metal skewer 5 and the coupling 13 is structured only by a portion 5a to be coupled having a polygonal cross section, cleaning of the coupling portion of the metal skewer 5 is very easy.

In the high frequency heating apparatus of the present invention, each of the portions constituting the coupling portion between the rotary driving means F and the metal skewer 5 is formed of conductive metal. Therefore, the high frequency heating apparatus can be surely grounded, thereby preventing a leak of the radio wave. Namely, the coupling 13 and the bearing 16 in contact with the outer periphery of the coupling 13 to support the same are grounded in the similar manner as the sidewall of the heating chamber 28. The coupling 13 is communicated with the sidewall 28c of the heating chamber 28 through one bearing 16 and the metal cylinder 15 to be grounded. The coupling 13 is communicated with the fixing angle 22 through the other bearing 16 and the metal cylinder 15 so as to be finally communicated with the sidewall 28c of the heating chamber to be grounded.

The spacer 8 and the metal guide bar 27 provided for rotatably receiving the end portion of the metal skewer 5 in the heating chamber 28 are respectively formed of dielectric materials. Therefore, no spark will be generated at the contact portion with the metal skewer 5 during rotation of the skewer 5.

As described above, according to the present invention, the coupling structure of the rotary driving means and the support means can be simplified. Consequently, cleaning of the heating chamber is very easy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A heating apparatus comprising:
    a heating chamber having at least two opposing sidewalls spaced apart by a predetermined distance, said heating chamber heating food introduced therein by at least one of a high frequency source and a heater;
    support means for supporting the food which is skewered thereon, said support means being rotatively suspended between the sidewalls of the heating chamber, the support means having a length which is shorter than the predetermined distance between the sidewalls;
    rotary driving means for rotating said support means in said heating chamber;
    coupling means provided outside of one of said sidewalls of said heating chamber for coupling an end portion of said support means with said rotary driving means; and
    a support member arranged at a position opposing said coupling means, said support member being readily detachably mounted on a sidewall opposite the one sidewall on which said coupling means is provided, said support member being detachably mounted on the sidewall by at least one fixing screw projecting from the sidewall, the support member having at least one notch defined therein for slidably receiving the fixing screw upon mounting of the sidewall, said support member rotatively supporting an other end portion of the support means opposite to the end portion coupled to the coupling means, a tip of the other end portion of the support means being spaced from the sidewall of the heating chamber when the support means is supported by the support member, and said support member further having a recess defined in a top portion thereof for receiving the tip of the other end portion of the support means.

2. The heating apparatus according to claim 1, wherein two fixing screws project from the sidewall and wherein two notches are defined in the support member, each of the two notches receiving one of the fixing screws when the support member is slid onto the fixing screws.

3. The heating apparatus according to claim 1, wherein the support means comprises an elongated skewer having a first diameter and the tip of the support means having a second diameter, the first diameter being greater than the second diameter, said tip of the support means resting in the recess of the support member when the support member is supporting the support means.

4. The heating apparatus according to claim 1, wherein the support member is heat resistant and is formed of a dielectric with small high frequency loss.

5. The heating apparatus according to claim 1, further comprising both a high frequency generator and a heater whereby said heating chamber heats the food by both the high frequency generator and the heater.

6. The heating apparatus according to claim 1, wherein said support means comprises a metal bar portion having a circular cross section.

7. The high frequency heating apparatus according to claim 1, wherein the tip of the other end portion of said support means has a pointed shape.

8. The heating apparatus according to claim 1, wherein the other end portion of said support means has a groove which engages with said support member.

9. The heating apparatus according to claim 8, wherein said groove is longer than an engaging portion of said support member.

10. The heating apparatus according to claim 1, wherein said support means comprises fixing means at a central portion thereof for fixing said food on said support means.

11. The heating apparatus according to claim 10, wherein said fixing means comprises two fixing jigs which fix said food by piercing the food from both sides, one of said fixing jigs being movably attached along said support means and the other one of said fixing jigs being fixed on said support means.

12. The heating apparatus according to claim 1, wherein said support member is heat resistant, and has a portion formed of a dielectric with small high frequency loss.

13. The heating apparatus according to claim 1, wherein said support member comprises:
    a support receiving member receiving the other end portion of said support means;

a projection member projecting from the one of said sidewalls of said heating chamber on which the support receiving member is attached; and a fixing member for detachably fixing the projection member on said sidewall.

14. The heating apparatus according to claim 1, wherein said coupling means has a concave portion at one end portion thereof in which one end portion of said support means is received.

15. The heating apparatus according to claim 14, wherein said concave portion has a cross section similar to that of one end portion of said support means.

16. The heating apparatus according to claim 15, wherein the cross section of said concave portion and the cross section of the one end portion of said support means are polygonal.

17. The heating apparatus according to claim 14, further comprising a guiding member for guiding the one end portion of said support means to be received by said concave portion.

18. The heating apparatus according to claim 17, wherein said guiding member is readily detachable from an inner side of one of said sidewalls.

19. The heating apparatus according to claim 1, wherein the other end portion of said coupling means is conical.

20. The heating apparatus according to claim 1, wherein said coupling means is rotatably supported.

21. The heating apparatus according to claim 1, wherein said coupling means is formed of rust-proofing metal.

22. The heating apparatus according to claim 1, wherein said rotary driving means comprises a driving gear provided on a motor, and a driven gear engaging with the driving gear.

23. The heating apparatus according to claim 22, wherein said driven gear is attached to said coupling means.

* * * * *